US012263534B2

(12) United States Patent
Chen et al.

(10) Patent No.: US 12,263,534 B2
(45) Date of Patent: Apr. 1, 2025

(54) LASER BEAM SHAPING DEVICE, LASER PROCESSING SYSTEM AND LASER INTERLOCKING WELDING STRUCTURE

(71) Applicant: Industrial Technology Research Institute, Hsin-Chu (TW)

(72) Inventors: Yuan-Di Chen, Tainan (TW); Wu-Jung Tsai, Tainan (TW); Chia-Yu Hu, Tainan (TW)

(73) Assignee: INDUSTRIAL TECHNOLOGY RESEARCH INSTITUTE, Hsin-Chu (TW)

( * ) Notice: Subject to any disclaimer, the term of this patent is extended or adjusted under 35 U.S.C. 154(b) by 476 days.

(21) Appl. No.: 17/106,073

(22) Filed: Nov. 28, 2020

(65) Prior Publication Data

US 2022/0126397 A1 Apr. 28, 2022

(30) Foreign Application Priority Data

Oct. 26, 2020 (TW) .................. 109137106

(51) Int. Cl.
*B23K 26/06* (2014.01)
*B23K 26/0622* (2014.01)
(Continued)

(52) U.S. Cl.
CPC ...... *B23K 26/0648* (2013.01); *B23K 26/0624* (2015.10); *B23K 26/0643* (2013.01);
(Continued)

(58) Field of Classification Search
CPC ............ B23K 26/0648; B23K 26/0624; B23K 26/0643; B23K 26/0676; B23K 26/32;
(Continued)

(56) References Cited

U.S. PATENT DOCUMENTS 4,691,093 A 9/1987 Banas et al.
5,155,323 A 10/1992 Macken
(Continued)

FOREIGN PATENT DOCUMENTS

CN 203101668 U * 7/2013
CN 103551732 A 2/2014
(Continued)

OTHER PUBLICATIONS

CN-106695113-A English (Year: 2017).*
(Continued)

*Primary Examiner* — Jimmy Chou
*Assistant Examiner* — William C. Gibson
(74) *Attorney, Agent, or Firm* — WPAT, PC

(57) ABSTRACT

A laser beam shaping device includes a multi-zone structure lens and a focusing lens. The multi-zone structure lens includes a lens body and a refractive structure. The lens body has an incident plane and an emission plane, and one of the incident plane and the emission plane is furnished with the refractive structure. The light source passing through the refractive structure deviates and leaves the lens body via the emission plane. The light source passing through the lens body is divided into N sets of light beams. After the N sets of light beams penetrate through the focusing lens, N set of incident beams are formed to project the interface of the first material and the second material in an oblique inward manner with respect to the optical axis of the focusing lens. In additional, a laser processing system and a laser interlocking welding structure respectively are also provided.

22 Claims, 12 Drawing Sheets

(51) Int. Cl.
| | |
|---|---|
| *B23K 26/067* | (2006.01) |
| *B23K 26/32* | (2014.01) |
| *B23K 26/324* | (2014.01) |
| *B23K 37/04* | (2006.01) |
| *C03C 27/02* | (2006.01) |
| *G02B 3/00* | (2006.01) |
| *G02B 19/00* | (2006.01) |
| *G02B 27/09* | (2006.01) |

(52) U.S. Cl.
CPC ......... *B23K 26/0676* (2013.01); *B23K 26/32* (2013.01); *B23K 26/324* (2013.01); *B23K 37/0435* (2013.01); *C03C 27/02* (2013.01); *G02B 3/00* (2013.01); *G02B 19/0009* (2013.01); *G02B 27/0933* (2013.01); *G02B 27/0955* (2013.01); *G02B 2003/0093* (2013.01)

(58) Field of Classification Search
CPC .. B23K 26/324; B23K 37/0435; B23K 26/21; B23K 2103/02; B23K 2103/18; B23K 2103/54; B23K 26/067; C03C 27/02; G02B 3/00; G02B 19/0009; G02B 27/0933; G02B 27/0955; G02B 2003/0093; G02B 3/08; G02B 27/0905
See application file for complete search history.

(56) References Cited

U.S. PATENT DOCUMENTS

| | | | |
|---|---|---|---|
| 5,841,097 A | 11/1998 | Esaka et al. | |
| 6,610,050 B2 | 8/2003 | Bille | |
| 2003/0213787 A1* | 11/2003 | Dunsky | B23K 26/382 |
| | | | 219/121.75 |
| 2011/0128838 A1* | 6/2011 | Kimura | G11B 7/1362 |
| 2013/0271830 A1* | 10/2013 | Mikhailov | G02B 5/001 |
| | | | 359/639 |
| 2014/0231398 A1 | 8/2014 | Land et al. | |
| 2017/0371166 A1* | 12/2017 | Rudolf | B23K 26/067 |
| 2020/0198054 A1* | 6/2020 | Rudolf | G02B 5/001 |

FOREIGN PATENT DOCUMENTS

| | | | | |
|---|---|---|---|---|
| CN | 104289811 A | | 1/2015 | |
| CN | 106271111 A | | 1/2017 | |
| CN | 106695113 A | * | 5/2017 | ........... B23K 26/043 |
| CN | 107160032 A | * | 9/2017 | |
| CN | 107243690 A | | 10/2017 | |
| CN | 106271111 B | | 11/2019 | |
| EP | 0775549 A2 | | 5/1997 | |
| TW | I223843 | | 11/2004 | |
| TW | I570880 B | | 2/2017 | |
| TW | 201915451 A | | 4/2019 | |

OTHER PUBLICATIONS

TW OA issued on Oct. 5, 2021.
Khonina et al. "Formation of hybrid higher-order cylindrical vector beams using binary multi-sector phase plates", Sep. 25, 2018, www.nature.com/scientificreports.
Laskin et al. "Multi-focus beam shaping of high power multimode lasers", 2017, SPIE Nanoscience + Engineering, San Diego, California, U.S.
Obata et al. "Multi-focus two-photon polymerization technique based on individually controlled phase modulation", Jul. 29, 2010, vol. 18, No. 16, Optics Express.
Zhang et al. "Direct welding of glass and metal by 1 kHz femtosecond laser pulses Applied Optics vol. 54, pp. 8957-8961 (2015)."
Huang et al. "Femtosecond fiber laser welding of dissimilar metals Applied Optics vol. 53, pp. 6569-6578 (2014)".

* cited by examiner

LASER BEAM SHAPING DEVICE, LASER PROCESSING SYSTEM AND LASER INTERLOCKING WELDING STRUCTURE

CROSS REFERENCE TO RELATED APPLICATION

This application claims the benefits of Taiwan application Serial No. 109137106, filed Oct. 26, 2020, the disclosures of which are incorporated by references herein in its entirety.

TECHNICAL FIELD

The present disclosure relates in general to a laser beam shaping device, a laser processing system and a laser interlocking welding structure.

BACKGROUND

With the development of emerging technologies and new materials such as smart vehicles, internet of things and artificial intelligence (AI), and with the rapid demand increase in sensing and testing devices, trends in developing the sensing and testing devices are directed to higher strengths, miniaturization and resistance against environmental changes. Therefore, the demand for joining glass and metal materials is gradually increasing.

In conventional glass and metal bonding technology, one of them is a evaporation bonding method, in which a metal or a glass are placed in a vacuum, then the metal is vaporized into a steam form for being deposited onto a glass or ceramic surface, such that the glass or ceramic surface can be coated by a thin layer of metal. However, the aforesaid coating method would consume a lot of energy, and thus a substitute and cheaper method is usually used to glue a metal layer or sheet onto the glass or ceramic material. Apparently, this substitute method is simple, but the adhesive is easy to deteriorate and thus affect the durability. In addition, after the adhesive is deteriorated to have the moisture invaded, the ability to withstand environmental changes would be degraded, such that the bonding strength between the metal and the glass or ceramic material would be reduced.

Further, since operations of electronic components will lead to heat generation, and this heat would cause some ingredients of the adhesive to volatilize, from which pollution and failure of the electronic components would be inevitable.

Therefore, how to improve the aforesaid problems will be definitely a crucial issue that the industry needs to solve.

SUMMARY

An object of the present disclosure is to provide a laser beam shaping device and a laser processing system, that, by waiving the adhesives, can modify a light source into multiple discrete sets of light beams, and can project these sets of light beams in an oblique manner onto a target material so as to produce an interlocking welding structure at an interface between the target material and an on-top material. Thereupon, area contact at the interface can be increased, and the laser welding strength can be further improved.

Another object of the present disclosure is to provide a laser interlocking welding structure, that can improve the bonding of two materials such as metal and glass, and further increase the welding strength between the two materials.

In one embodiment of this disclosure, the laser beam shaping device is applied to process an interface between a first material and a second material. The laser beam shaping device includes a multi-zone structure lens and a focusing lens. The multi-zone structure lens includes a lens body and a refractive structure. The lens body has an incident plane and an emission plane, and one of the incident plane and the emission plane is furnished with the refractive structure. The refractive structure has a depth into the lens body along an optical axis of the lens body. The lens body allows light source to penetrate through. The light source passing through the refractive structure deviates away from the optical axis and leaves the lens body via the emission plane. The light source passing through the lens body is divided into N sets of light beams, and N is greater than or equal to 2. The focusing lens is used for receiving the N sets of light beams from the multi-zone structure lens. After the N sets of light beams penetrate through the focusing lens, N set of incident beams are formed to project the interface of the first material and the second material in an oblique inward manner with respect to an optical axis of the focusing lens.

In another embodiment of this disclosure, the laser processing system is applicable for processing an interface between a first material and a second material. The laser processing system includes a laser source, a control system and a laser beam shaping device. The control system, connected with the laser source, is used for controlling the laser source to emit light source. The laser beam shaping device includes a multi-zone structure lens and a focusing lens. The multi-zone structure lens includes a lens body and a refractive structure. The lens body has an incident plane and an emission plane, and one of the incident plane and the emission plane is furnished with the refractive structure. The refractive structure has a depth into the lens body along an optical axis of the lens body. The lens body allows light source to penetrate through. The light source passing through the refractive structure deviates away from the optical axis and leaves the lens body via the emission plane. The light source passing through the lens body is divided into N sets of light beams, and N is greater than or equal to 2. The focusing lens is used for receiving the N sets of light beams from the multi-zone structure lens. After the N sets of light beams penetrate through the focusing lens, N set of incident beams are formed to project the interface of the first material and the second material in an oblique inward manner with respect to an optical axis of the focusing lens.

In a further embodiment of this disclosure, the laser interlocking welding structure applies the laser beam shaping device to process an interface between a first material and a second material to form the laser interlocking welding structure. The laser interlocking welding structure includes a first material and a second material. The first material includes N protrusions, and N is greater than or equal to 2. Each of protrusions of the first material is engaged into the second material.

As stated, in the laser beam shaping device and the laser processing system provided by this disclosure, the multi-zone structure lens of the laser beam shaping device can divide the light source beams into multiple separate sets of light beams for providing multiple and oblique projections into the target material, and thus the laser interlocking welding structure would be formed at the interface of the two welding materials. Thereupon, except that the contact area at the interface can be increased, the laser interlocking welding structure produced by the laser beam shaping device and the laser processing system of this disclosure can enhance the bonding between the two materials to be welded together (metal and glass for example), and also increase the welding strength of these two materials.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DETAILED DESCRIPTION

Figure 1:
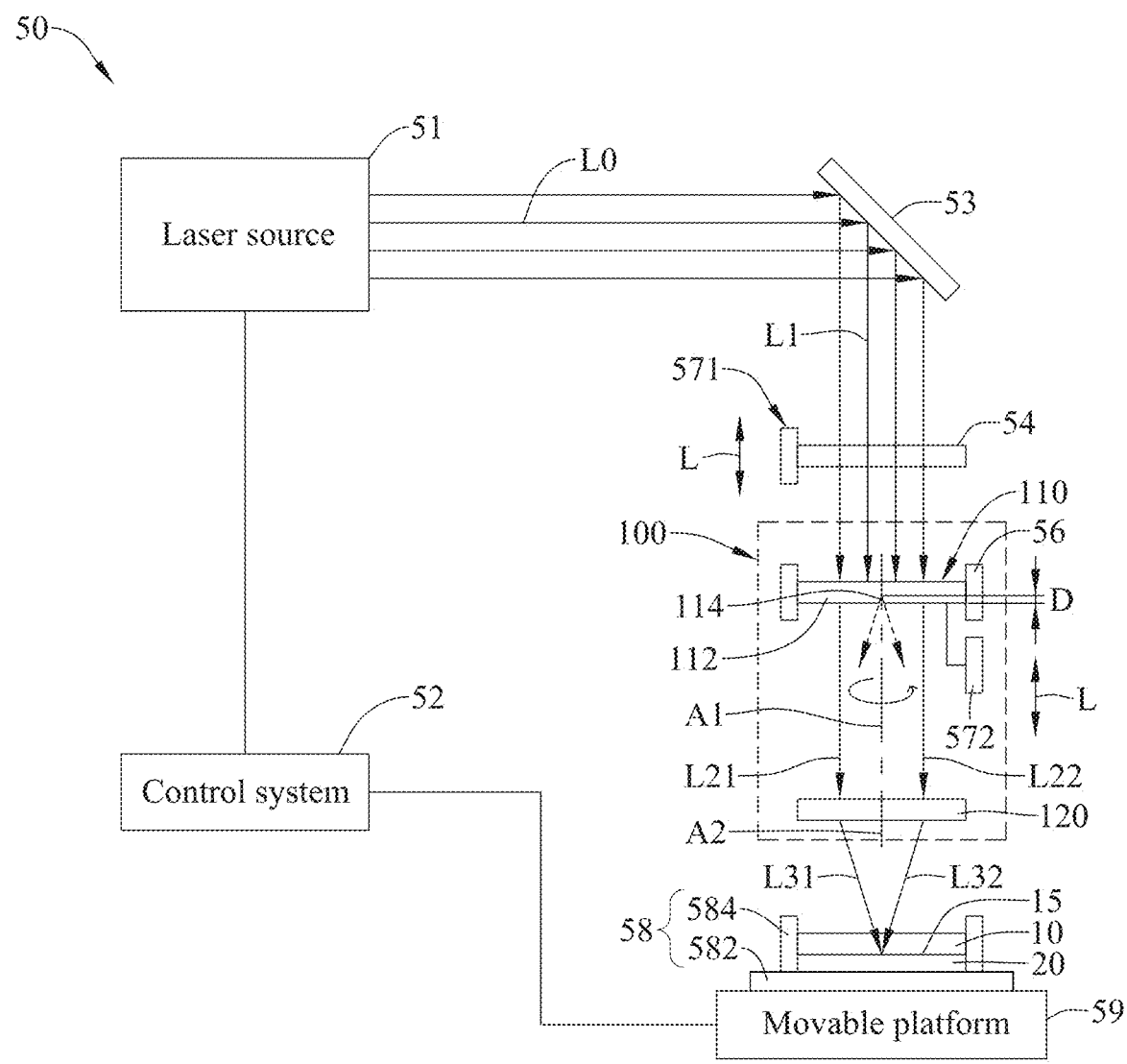
FIG. 1 is a schematic view of an embodiment of the laser processing system in accordance with this disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
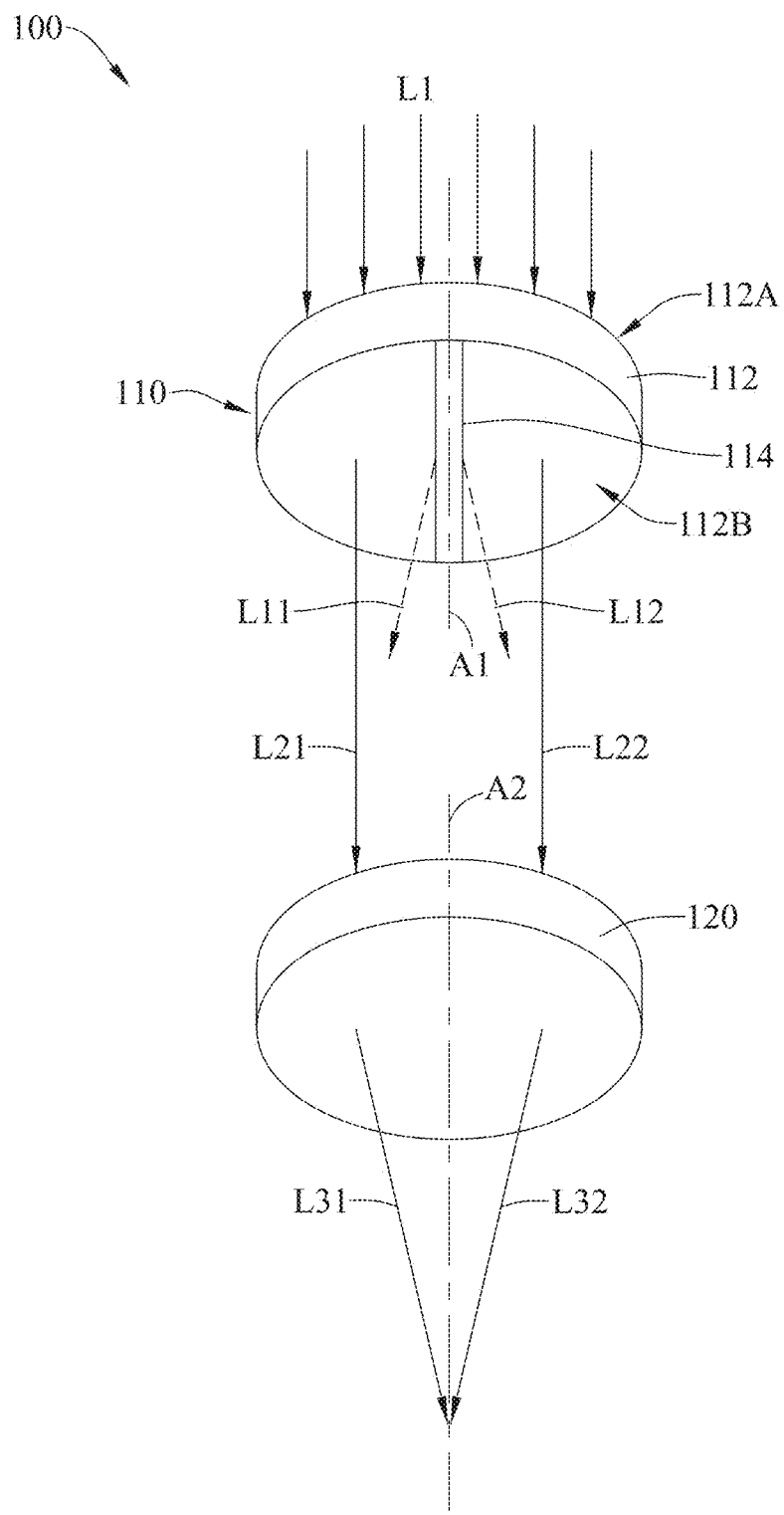
FIG. 2 is a schematic view of an embodiment of the laser beam shaping device in accordance with this disclosure.

Refer now to FIG. 1 and FIG. 2; where FIG. 1 is a schematic view of an embodiment of the laser processing system in accordance with this disclosure, and FIG. 2 is a schematic view of an embodiment of the laser beam shaping device in accordance with this disclosure. As shown, the laser processing system 50 and the laser beam shaping device 100 provided by this disclosure, based on an adhesion technique without any adhesive, is applicable to process an interface 15 of a first material 10 and a second material 20 adhered to the first material 10 by stacking together. The first material 10 can be a glass, and the second material 20 is a metal, in which $2 \geq \gamma 1/\gamma 2 \geq \frac{1}{2}$, where $\gamma 1$ is the coefficient of volume thermal expansion of the first material 10, and $\gamma 2$ is the coefficient of volume thermal expansion of the second material 20.

In this embodiment, the laser processing system 50 includes a laser source 51, a control system 52 and a laser beam shaping device 100. The control system 52, connected with the laser source 51, is used to control the laser source 51 to emit a light source L0, such as a laser light beam having a laser wavelength that provides specific penetration against the first material 10, so that the laser energy can reach the interface 15 of the first material 10 and the second material 20.

In this embodiment, the laser beam shaping device 100 includes a multi-zone structure lens 110 and a focusing lens 120. The multi-zone structure lens 110 includes a lens body 112 and a refractive structure 114. The lens body 112 includes an incident plane 112A and an emission plane 112B. At least one of the incident plane 112A and the emission plane 112B is distanced from the refractive structure 114 by a thickness D along the optical axis A1 of the lens body 112. The lens body 112 allows light beams L1 (not necessary to be parallel light beams as shown in the figure) to pass therethrough. The light beams L1 that pass through the refractive structure 114 would be refracted to form first deflected light beams L11 and second deflected light beams L12. The first deflected light beams L11 and the second deflected light beams L12 deflected individually by the refractive structure 114 would leave the lens body 112 via the emission plane 112B. That is, after the light beams L1 pass through the refractive structure 114, N light beams would be generated to leave the emission plane 112B, in which N is larger than or equal to 2 (i.e., N≥2). By having FIG. 1 and FIG. 2 as examples, N is equal to 2; i.e., the first deflected light beam L11 and the second deflected light beam L12. Since the light beams L1 are consisted of only parallel light, so it can be deemed as a light beam to penetrate the refractive structure 114 for the aforesaid light-beam calculation. Specifically, the first and second deflected light beams L11, L12 are diverse light beams with respect to the optical axis A1 that may or may not hit the focusing lens 120. The focusing lens 120 would receive the first light beams L21 and the second light beams L22 emitted from the multi-zone structure lens 110. After passing through the focusing lens 120, the first light beams L21 and the second light beams L22 would be focused thereby to form correspondingly N incident light beams individually forming respective angles to the optical axis A2 of the focusing lens 120; i.e., first incident beams L31 and second incident beams L32 in FIG. 1 or FIG. 2. The first and second incident beams L31, L32 would be concentrated to irradiate the first material 10 and the second material 20, especially the interface 15 between the first material 10 and the second material 20 (as shown in FIG. 1).

Upon such an arrangement, in the laser beam shaping device 100 and the laser processing system 50 of this disclosure, the multi-zone structure lens 110 of the laser beam shaping device 100 is applied to diverse a middle portion of the laser light so as to modify single parallel laser light into discrete laser light to be focused by the follow-up focusing lens 120 (for example, the first light beams L21 and the second light beams L22 in FIG. 1 or FIG. 2). Thus, after these discrete laser beams are concentrated by the same focusing lens, a multi-zone laser light pattern would be formed for projecting a target material. In this embodiment, after the first material 10, the second material 20 and the interface 15 between the first material 10 and the second material 20 are irradiated by the laser light in the aforesaid multi-zone laser light pattern, the first material 10 and the second material 20 would be heated up to melt. Due to counter pressure against laser invasion, oblique structures including protrusion and recessions would be formed in the melting region. In comparison with the prior art providing the laser light of a single-zone laser light pattern, the laser light of the multi-zone laser light pattern would generate N times of the protrusions and recessions that can be provided in the art. In particular, according to this disclosure, the protrusions and recessions for engagement are oblique structures with respect to the corresponding center points, and thus no structural weakness would be formed. With these protrusions and the recessions formed at the interface 15 of the first material 10 and the second material 20 for engagement or interlocking, a laser interlocking welding structure is formed at the interface 15 for providing more contact areas and for reinforcing the welding strength.

According to this disclosure, the arrangement of the laser processing system 50 is not specifically limited to the aforesaid embodiment. In another embodiment of this disclosure, the laser processing system 50 and the laser beam shaping device 100 can further include a reflective lens 53, a beam expander 54, a clamping device 58 and a movable platform 59. The clamping device 58 is used for clamping both the first material 10 and the second material 20. By having FIG. 1 as an example, the clamping device 58 can include a clamping base 582 and clamping walls 584. The clamping base 582 is used for orderly carrying thereon the second material 20 and the first material 10, and the clamping walls 584 are used for laterally limiting and holding the first material 10 and the second material 20, such that the first material 10 and the second material 20 can be held in position. In addition, the movable platform 59, carrying thereon the clamping device 58, is connected with and thus controlled by the control system 52. With the control system 52 to displace the movable platform 59, positions of the first material 10 and the second material 20 held by the clamping device 58 can thus be adjusted.

On the other hand, the reflective lens 53 is disposed between the laser source 51 and the multi-zone structure lens 110. While the control system 52 orders the laser source 51 to emit a light source beam L0, the reflective lens 53 is used to receive and further reflect the light source beam Lo from the laser source 51. Then, the reflected light source beam L1 would be led to the multi-zone structure lens 110. In one embodiment of this disclosure, the beam expander 54, disposed between the reflective lens 53 and the multi-zone structure lens 110, is used for receiving the reflected light source beam L1 from the reflective lens 53, and further for projecting the light source beam L1 to the multi-zone structure lens 110.

In one embodiment of this disclosure, the multi-zone structure lens 110 can be constructed by liquid crystal on silicon, diffractive optical elements or Fresnel lens.

Figure 3:
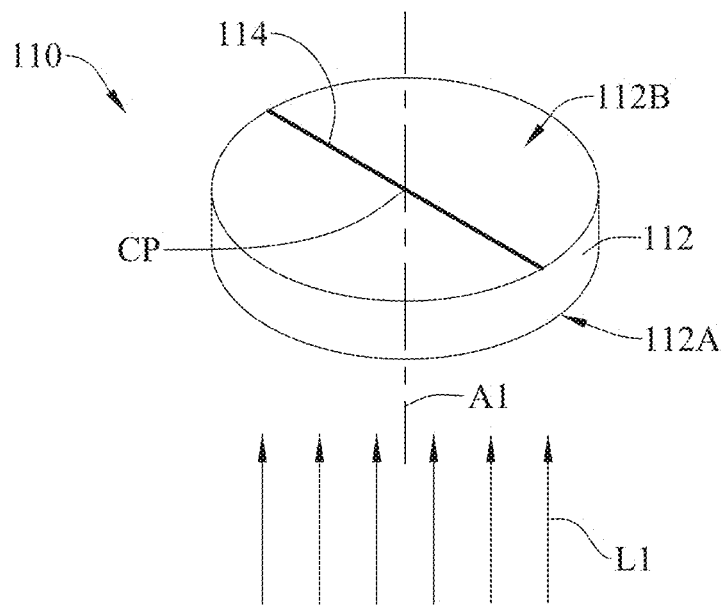
FIG. 3 is a schematic view of an embodiment of the multi-zone structure lens in accordance with this disclosure.
Figure 4:
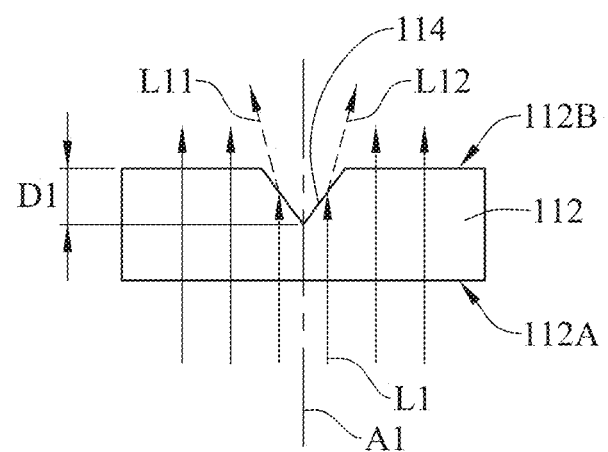
FIG. 4 is a schematic side view of FIG. 3.

In detail, as shown in FIG. 3, the multi-zone structure lens 110 may have (N−1) refractive structures (one refractive structure 114 in the figure) with respect to a center point CP of the lens body 112, where the optical axis A1 passes through the center point CP. The refractive structure 114 is disposed on the emission plane 112B of the lens body 112. As shown in FIG. 4, the refractive structure 114 is a groove concave down from the emission plane 112B of the lens body 112, and the groove can be a V-shaped groove. The refractive structure 114 has a depth D1 along the optical axis A1 of the lens body 112 from the emission plane 112B. In another embodiment, the refractive structure 114 can be a polygonal groove. In one embodiment of this disclosure, inner surfaces of the refractive structure 114 is planes. In particular, the inner surfaces of the refractive structure 114 are polished surfaces. Upon such an arrangement, while the light source L1 passes through the refractive structure 114, refraction would happen to the light source L1 due to the groove shape of the refractive structure 114. As described above, the first deflected light beams L11 and the second deflected light beams L12 would be generated to deviate from the optical axis A1 of the refractive structure 114. In one embodiment of this disclosure, the refractive structure 114 can be made of a structure with total reflection. That is, after the light source L1 passes through the refractive structure 114, a dark zone without any light beam to pass would be formed on the emission plane 112B in an area corresponding to the refractive structure 114. Meanwhile, in the areas close to the dark zone, two bright zones on the emission plane 112B are formed and separated by the dark zone.

Figure 5:
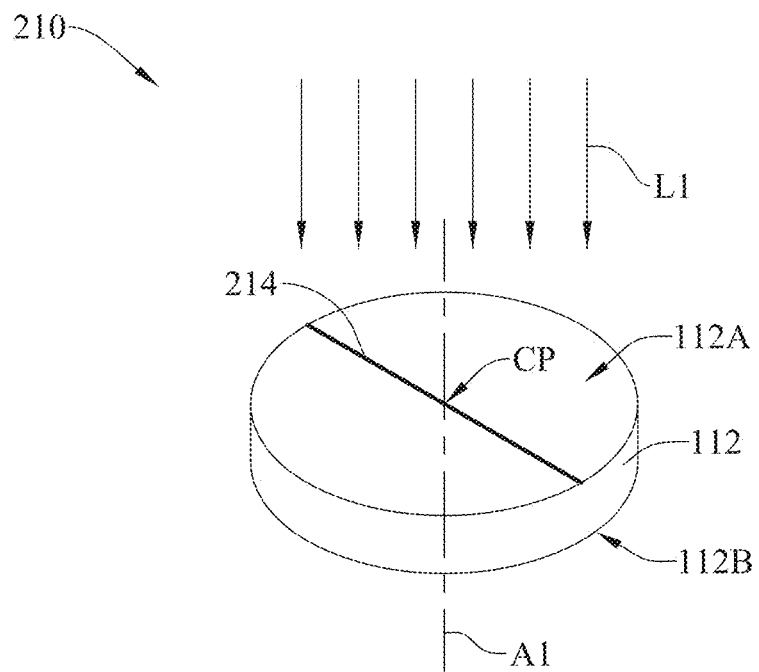
FIG. 5 is a schematic view of another embodiment of the multi-zone structure lens in accordance with this disclosure.
Figure 6:
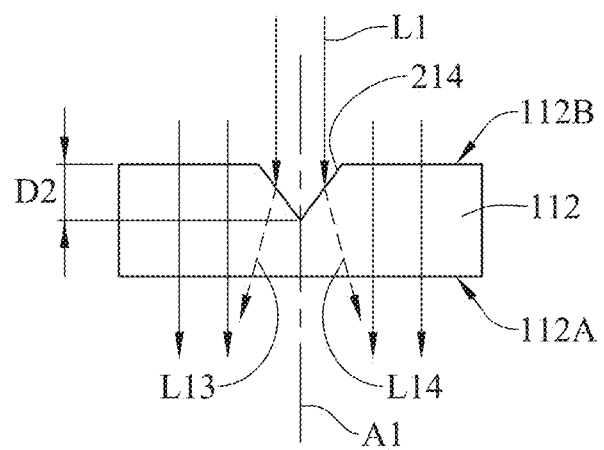
FIG. 6 is a schematic side view of FIG. 5.

In one embodiment of this disclosure, as shown in FIG. 5 and compared to FIG. 3, the refractive structure 214 of the multi-zone structure lens 210 is constructed on the incident plane 112A of the lens body 112. In other words, the refractive structure of this disclosure can be furnished to at least one of the emission plane and the incident plane of the lens body 112. As shown in FIG. 6, the refractive structure 214 is formed as a groove concave from the incident plane 112A of the lens body 112, and the groove can be a V-shaped groove. The refractive structure 214 has a second depth D2 along the optical axis A1 of the lens body 112 from the incident plane 112A. In another embodiment, the aforesaid groove can be polygonal. In one embodiment of this disclosure, inner surfaces of the refractive structure 214 are planes. In another embodiment of this disclosure, the inner surfaces of the refractive structure 214 are polished surfaces. Upon such an arrangement, while the light source L1 passes through the incident plane 112A of the lens body 112, refraction would happen to the light source L1 passing through the refractive structure 214 due to the shape of the refractive structure 214, such that the first deflected light beams L13 and the second deflected light beams L14 would deviate from the refractive structure 214.

Figure 7:
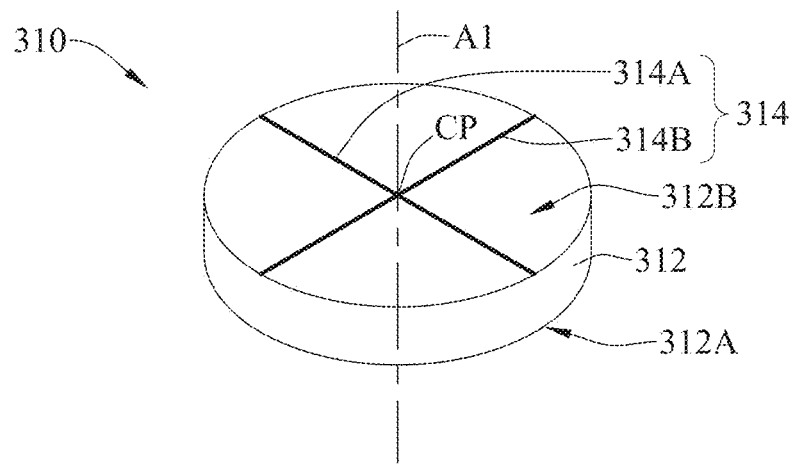
FIG. 7 is a schematic view of a further embodiment of the multi-zone structure lens in accordance with this disclosure.

In one embodiment of this disclosure, as shown in FIG. 7 and compared to the refractive structure 114 or 214 in FIG. 3 through FIG. 6, the multi-zone structure lens 310 includes two refractive structures 314 crossed at the center point CP of the lens body 312; i.e., the first refractive structure 314A and the second refractive structure 314B. In addition, in this embodiment, the refractive structure 314 is disposed on the emission plane 312B of the lens body 312. In one embodiment of this disclosure, the refractive structure 314 can be provided to the incident plane 312A of the lens body 312.

Figure 8A:
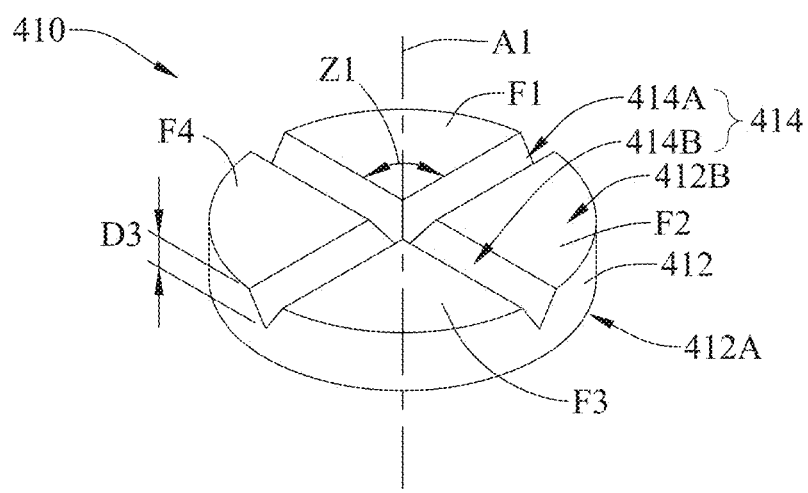
FIG. 8A is a schematic perspective view of an exemplary embodiment of the multi-zone structure lens in accordance with this disclosure.

In one embodiment of this disclosure, as shown in FIG. 8A, a schematic perspective view of an exemplary embodiment of the multi-zone structure lens in accordance with this disclosure is shown. In this embodiment, the multi-zone structure lens 410 is a structure with refractive structures 414 formed as surface grooves on the emission plane 412B of the lens body 412. In one embodiment of this disclosure, the refractive structures 414 can be surface grooves on the incident plane 412A of the lens body 412.

Figure 8B:
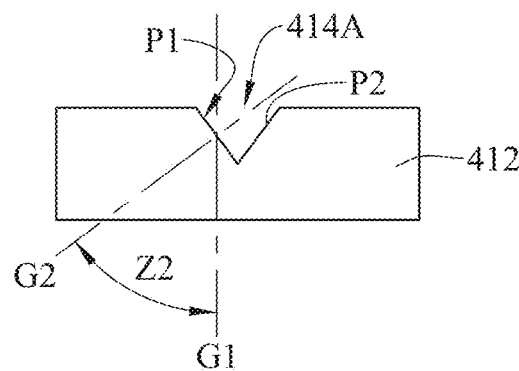
FIG. 8B is a schematic side view of the first refractive structure of FIG. 8A.

In one embodiment of this disclosure, the (N−1) refractive structures are applied to have the lens body furnished with 2(N−1) protruding structures with respect to the refractive structures. Namely, the refractive structure is a concave structure with respect to the protruding structure. By having FIG. 8A as example, the first refractive structure 414A and the second refractive structure 414B are crossed at the center point CP so as to form four protruding structures F1, F2, F3, F4 on the lens body 412. Each of the protruding structures F1, F2, F3, F4 has a height D3 from a bottom of the neighboring refractive structure 414A or 414B. The angle between each of the protruding structures F1, F2, F3, F4 and the neighboring refractive structure 414 is $360°/(2\times(N-1))$ at the center point CP. For example, the angle Z1 between the protruding structure F1 and the neighboring first refractive structure 414A or the second refractive structure 414B at the center point CP is 90°. In addition, if the first refractive structure 414A has a first inclined plane P1 and a second inclined plane P2 (see FIG. 8B), an equation for calculating the angle Z2 between a normal line G2 of the first inclined plane P1 of the first refractive structure 414A and another normal line G1 of the lens body 412 之 normal line G1 is:

$$Z2 = \sin^{-1}\frac{n1}{n2},$$

in which n1 is the material refractivity of the multi-zone structure lens, and n2 is the air refractivity. Likewise, the second refractive structure 414B can have the first inclined plane P1 and the second inclined plane P2 like the first refractive structure 414A does. Angling for the second inclined plane P2 of the second refractive structure 414B may be obtained by a similar equation for calculating the angle Z2 as previously described for the first inclined plane P1 of the first refractive structure 414A.

Figure 9:
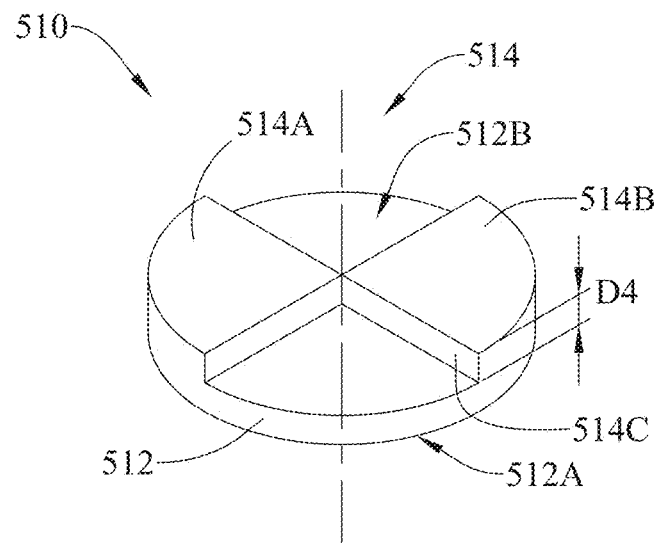
FIG. 9 is a schematic perspective view of another exemplary embodiment of the multi-zone structure lens in accordance with this disclosure.
Figure 10:
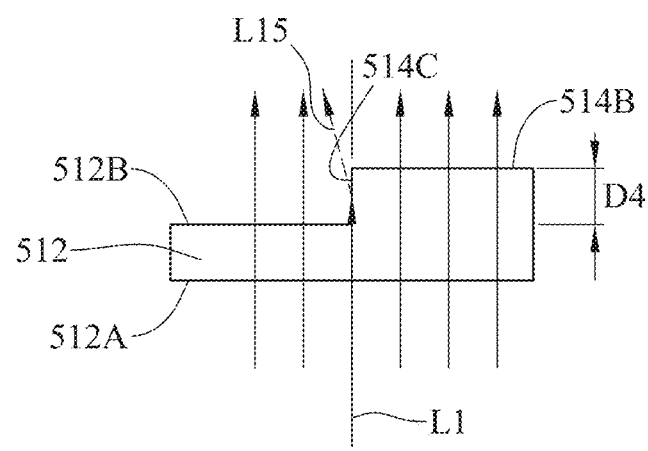
FIG. 10 is a schematic cross-sectional view of FIG. 9.

In another embodiment of this disclosure, as shown in FIG. 9 and FIG. 10, the multi-zone structure lens 510 includes a lens body 512 and protruding structures 514 protruding over the emission plane 512B of the lens body 512. The protruding structures 514 may include a first protruding structure 514A and a second protruding structure 514B, where a top plane of the second protruding structure 514B is higher than the emission plane 512B of the lens body 512 by a thickness D4. Thereupon, a step structure is formed on top of the lens body 512 for exposing a refractive structure 514C. As shown, the refractive structure 514C is a lateral side wall of the second protruding structure 514B. Referring to FIG. 10, the light source L1 passing through the lateral side wall 514C would be deflected to form a deflected light beam L15. Similarly, the lateral side wall of the first protruding structure 514A can be also used as the refractive structure. In one embodiment of this disclosure, the protruding structure 514 can be constructed over the incident plane 512A of the lens body 512.

Figure 11A:
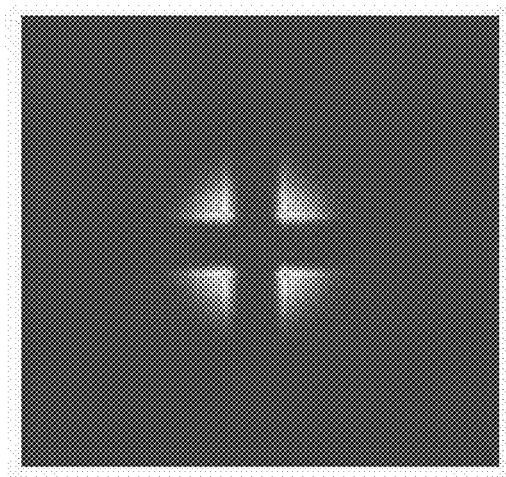
FIG. 11A to FIG. 11C demonstrate schematically light-beam patterns corresponding to adjustments upon the rotating mechanism of an embodiment at different angles in accordance with this disclosure.
Figure 11B:
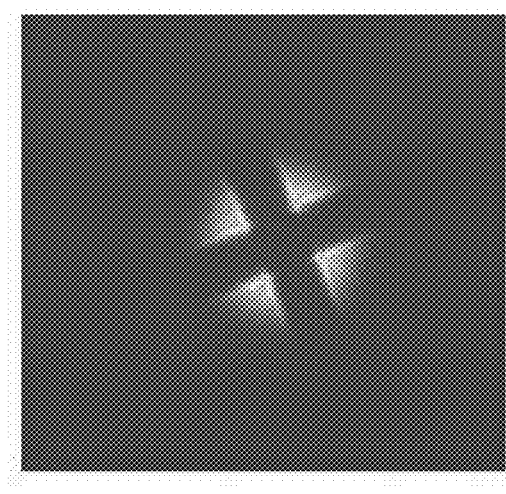
Figure 11C:
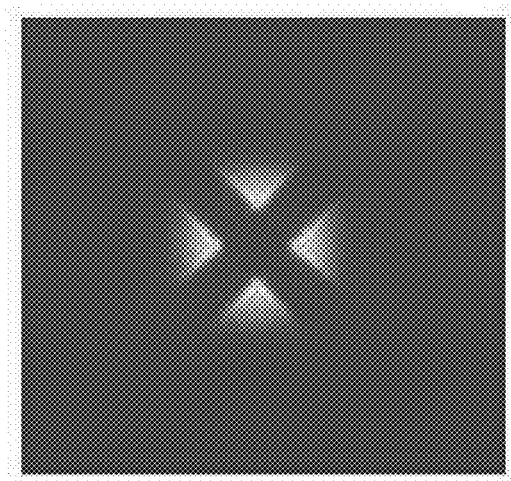

Referring back to FIG. 1, the laser processing system 50 and the laser beam shaping device 100 can further include a rotating mechanism 56 for mounting the multi-zone structure lens 110 and for rotating the multi-zone structure lens 110. For example, as shown in FIG. 11A through FIG. 11C, FIG. 11A illustrates schematically four light beams with the rotating mechanism 56 at a rotation angle of 0°, FIG. 11B illustrates schematically four light beams with the rotating mechanism 56 at a rotation angle of 22.5°, and FIG. 11C illustrates schematically four light beams with the rotating mechanism 56 at a rotation angle of 45°.

Figure 12A:
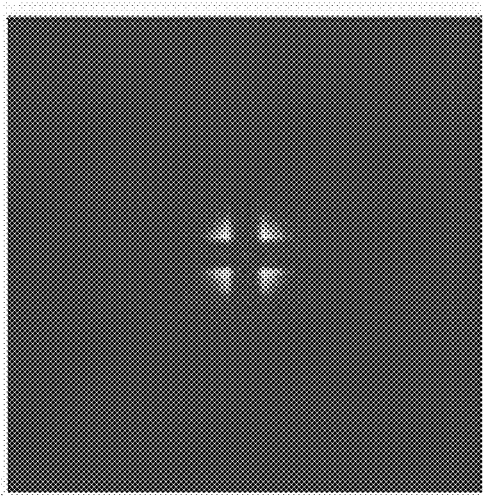
FIG. 12A to FIG. 12C demonstrate schematically light-beam patterns corresponding to adjustments upon the beam expander of an embodiment at different positions in accordance with this disclosure.
Figure 12B:
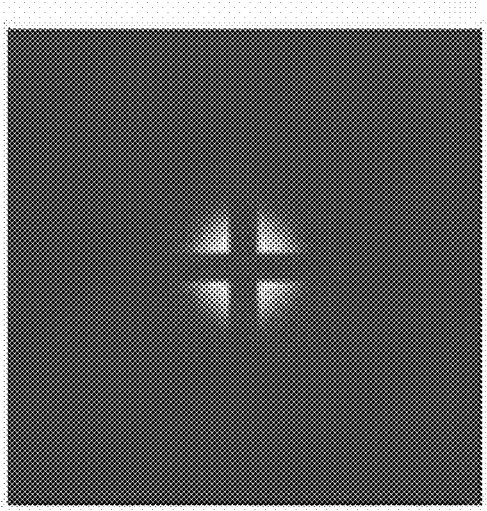
Figure 12C:
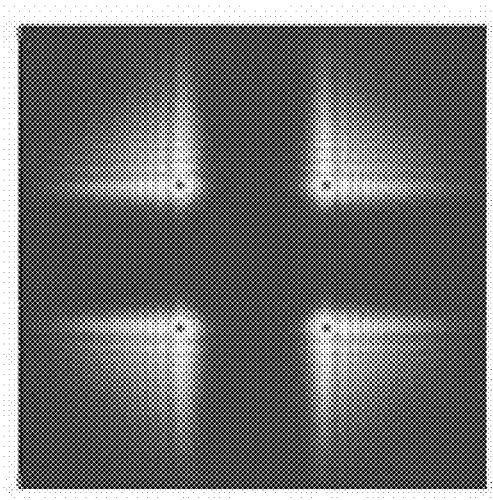

In one embodiment of this disclosure, the laser processing system 50 and the laser beam shaping device 100 can further include a first movable platform 571. As the first movable platform 571 displaces toward the beam expander 54 in a moving direction L, the beam expander 54 may be moved away or close to the multi-zone structure lens 110, such that the spacing between the multi-zone structure lens 110 and the beam expander 54 can be adjusted. Preferably, the foregoing spacing is ranging within 0 mm~1000 mm, and the beam expander 54 has a focal length ranging within −1000 mm~1000 mm. For example, as shown in FIG. 12A to FIG. 12C, different light-beam patterns have been schematically illustrated by varying the spacing between the beam expander 54 and the multi-zone structure lens 110.

In one embodiment of this disclosure, the laser processing system 50 and the laser beam shaping device 100 can further include a second movable platform 572 connected with the multi-zone structure lens 110. The second movable platform 572 displaces in a moving direction L to move the multi-zone structure lens 110, such that the multi-zone structure lens 110 can move toward or away from the focusing lens 120. Thereupon, the spacing between the multi-zone structure lens 110 and the focusing lens 120 can be adjusted. Preferably, the spacing is ranging within 0 mm~1000 mm.

Figure 13A:
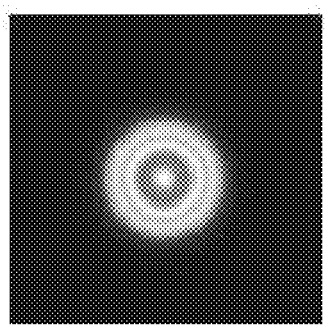
FIG. 13A demonstrates schematically a light-beam pattern of a conventional laser welding technique.
Figure 13B:
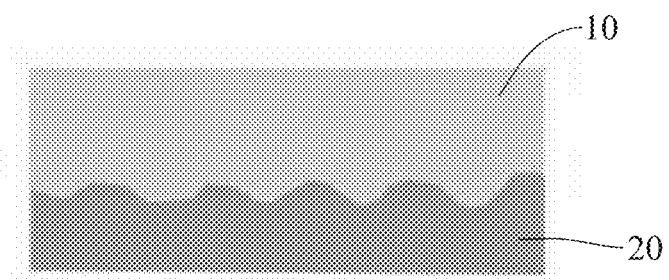
FIG. 13B shows schematically an interface of two materials formed by the conventional laser welding technique of FIG. 13A.
Figure 13C:
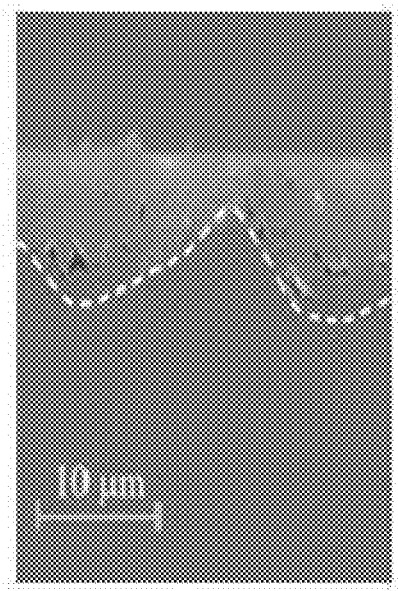
FIG. 13C shows schematically a portion of an interface of two materials formed by the conventional laser welding technique under a scanning electron microscope.
Figure 14A:
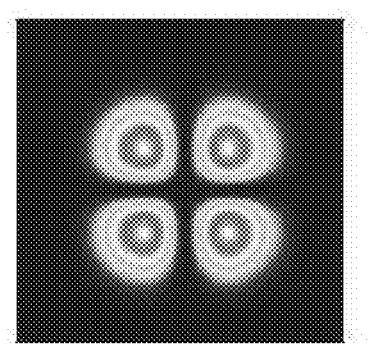
FIG. 14A is a schematic view of a light-beam pattern having multiple light beams and formed by the laser beam shaping device in accordance with this disclosure.
Figure 14B:
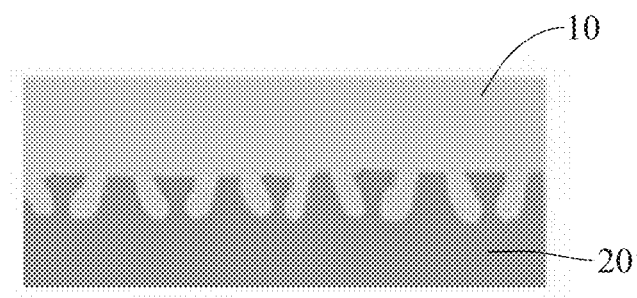
FIG. 14B shows schematically an interface of two materials formed by the laser beam shaping device of FIG. 14A.
Figure 14C:
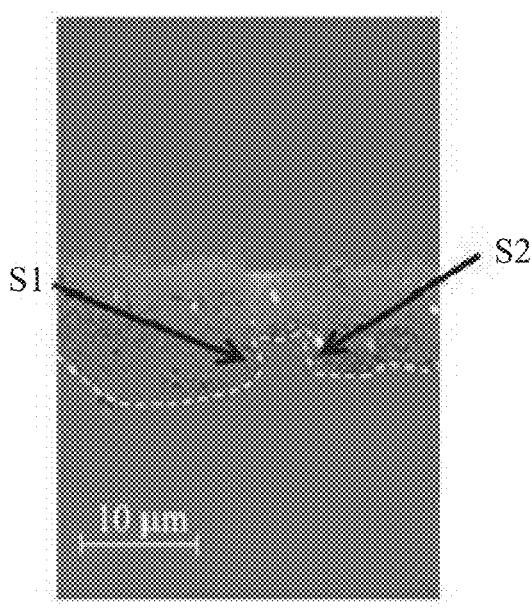
FIG. 14C shows schematically a portion of an interface of two materials formed by the laser shaping of FIG. 14A under a scanning electron microscope.
Figure 15:
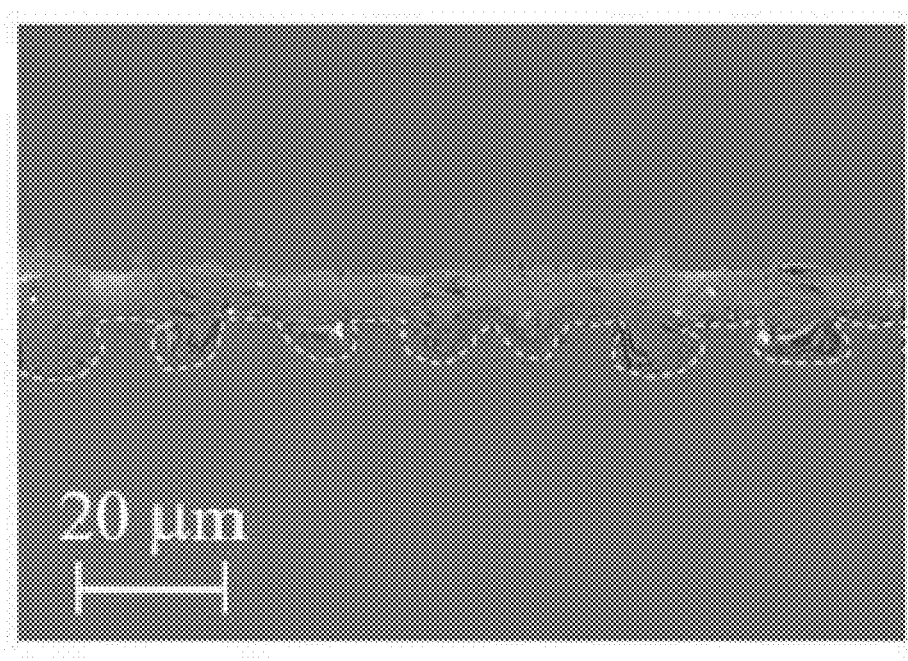
FIG. 15 shows schematically another portion of an interface of two materials formed by the laser shaping of FIG. 14A under a scanning electron microscope.

Refer now to FIG. 13A through FIG. 15; where FIG. 13A demonstrates schematically a light-beam pattern of a conventional laser welding technique, FIG. 13B shows schematically an interface of two materials formed by the conventional laser welding technique of FIG. 13A, FIG. 13C shows schematically a portion of an interface of two materials formed by the conventional laser welding technique under a scanning electron microscope, FIG. 14A is a schematic view of a light-beam pattern having multiple light beams and formed by the laser beam shaping device in accordance with this disclosure, FIG. 14B shows schematically an interface of two materials formed by the laser beam shaping device of FIG. 14A, FIG. 14C shows schematically a portion of an interface of two materials formed by the laser shaping of FIG. 14A under a scanning electron microscope, and FIG. 15 shows schematically another portion of an interface of two materials formed by the laser shaping of FIG. 14A under a scanning electron microscope. As shown, though the prior art utilizes the laser to perform welding, yet the light beam used for laser welding is a Gauss light beam. By having the Gauss light beam to irradiate the interface between the glass and the metal (for example, the interface 15 between the first material 10 and the second material 20), the glass and the metal would be heated up to melt, then the expansion pressure caused by the melted materials would fill the melted glass and metal into the spacing between the solid-state glass and the solid-state metal. If the laser welding applies parallel light beams directly as shown in FIG. 13A to perform vertical penetration, then the resulted interface between the glass and the metal as shown in FIG. 13B would display no significant depths (in comparison to FIG. 14B). On the other hand, according to this disclosure, the multi-zone structure lens is used to generate a light pattern having connected central dark zones (corresponding to the refractive structures on the lens body) and surrounding discrete bright zones, as shown in FIG. 14A. That is, the refractive structure of this disclosure would lead to the generation of one dark zone, and the parallel light beams would be modified or divided into multiple discrete light-beam zones having individual parallel light beams. Then, these surrounding and discrete light-beam zones would be led to pass through the focusing lens to be respectively concentrated to form the discrete light-beam pattern as shown in FIG. 14A. With such a discrete light-beam pattern, more depths to exist the interface can be obtained, due to a more-turbulent melting environment contributed by this type of laser input. It is noted that the light-beam patterns shown in FIG. 11A-FIG. 11C, FIG. 12A-FIG. 12C, FIG. 13A and FIG. 14A are all adopted from the laser beams at a cross section a distance from the focal point of the focusing lens. At the focal point of the focusing lens, all the light-beam patterns in all figures above would only show a bright spot, no matter if any refractive structure exists. Comparing FIG. 13C, FIG. 14C and FIG. 15, at least a first inner wall S1 and a second inner wall S2 exist at each irregular-shaped protrusion or recession of the interface of FIG. 14C, and, after solidification, the protrusions and recessions at the interface would be matched to form an interlocking structure for enhancing the welding strength at the interface; i.e., for reducing the possibility of occurring structural weakness at the interface.

Figure 16:
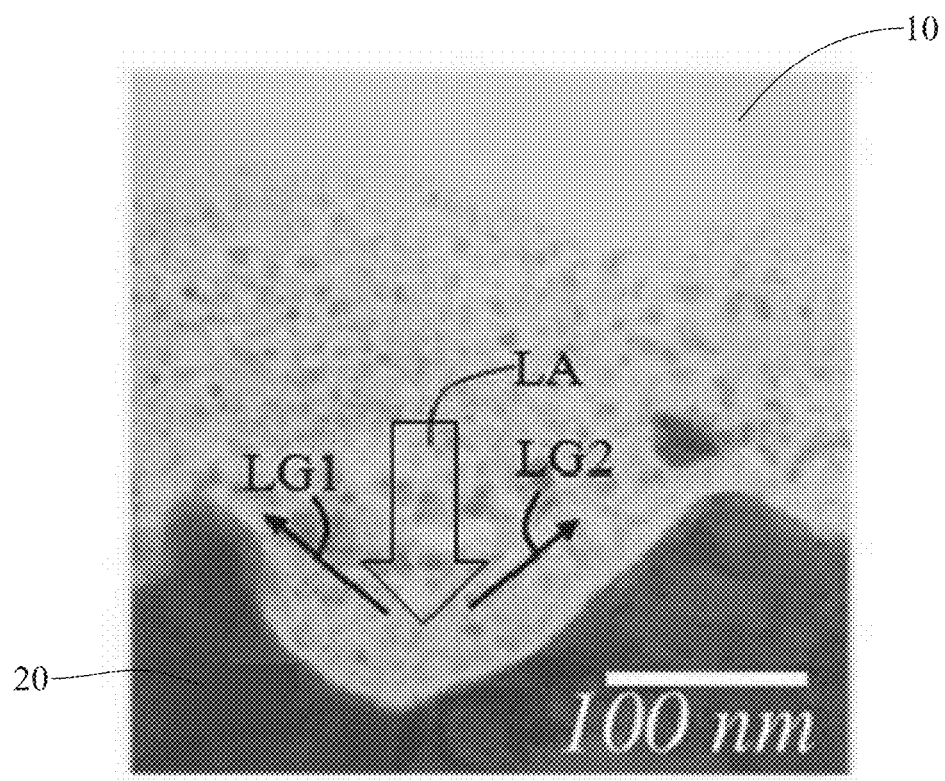
FIG. 16 shows schematically a laser-welded structure formed by the conventional laser welding technique of FIG. 13A.

Further, referring now to FIG. 16, a laser-welded structure formed by the conventional laser welding technique of FIG. 13A is schematically shown. In FIG. 16, compact laser light beams without any interior dark zone are utilized to irradiate the interface of the first material 10 and the second material 20 from an upright down direction as the incident direction LA. While in performing the Femtosecond pulse irradiation, electrons will transfer their own energy to corresponding lattices within picoseconds so as to melt the second material 20 (metal for example), and also to transform the first material 10 (glass for example) into a molten glass. Then, phase transition, melting and expansion will occur orderly in the focal area. The expansion will induce a reverse pressure to expel the melted second material 20. As shown in FIG. 16, the melted second material 20 would be expelled out in flow directions LG1, LG2, and further to fill the gaps between the first material 10 and the second material 20. Finally, the first material 10 and the second material 20 are solidified together to form the interface. In the aforesaid process, the melted second material 20 can be deemed as an adhesive. As shown in FIG. 13B and FIG. 13C, by having the convention laser welding technique to perform the welding, the engagement depth would be too swallow. Thus, a stress applied to the interface would tend to slide the material to the weak side. For example, if the first material 10 is a brittle glass, a stress would tend to break the interface and thus separate the first material 10 from the second material 20.

Figure 17:
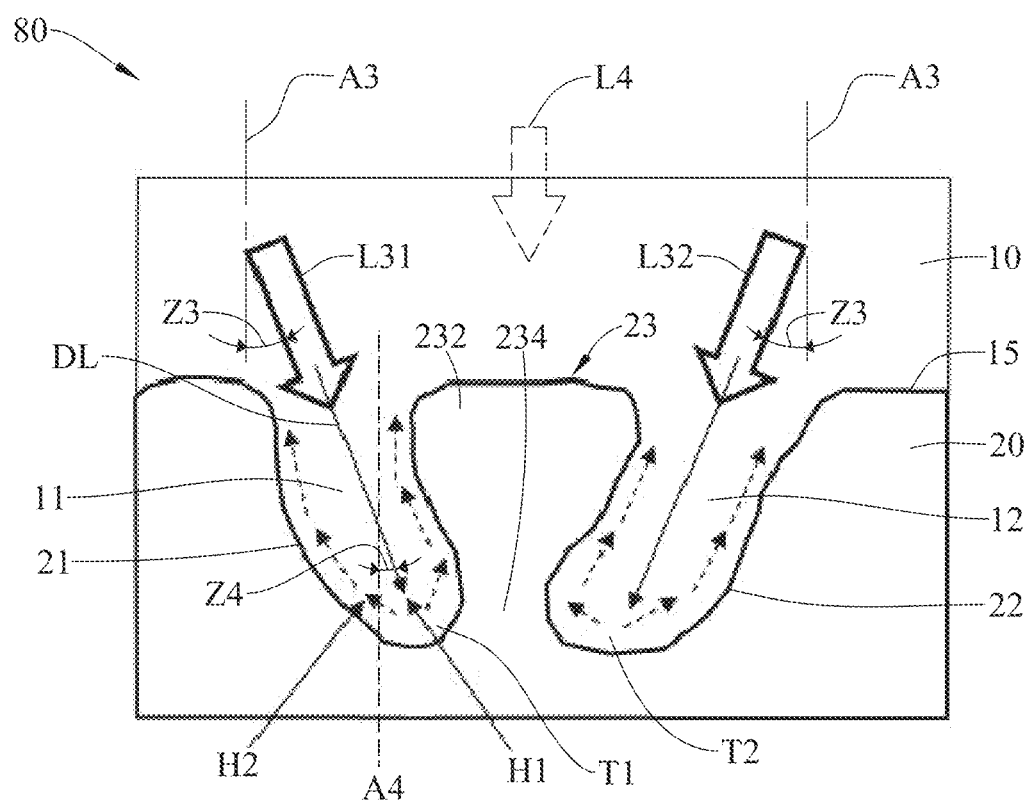
FIG. 17 is a schematic view showing a laser interlocking welding structure in accordance with this disclosure.

On the other hand, as shown in FIG. 17, a schematic view showing a laser interlocking welding structure in accordance with this disclosure is schematically illustrated. By having the laser beam shaping device 100 of this disclosure to perform the welding process, the interface 15 between the first material 10 and the second material 20 would be formed as the laser interlocking welding structure 80. As shown, the laser interlocking welding structure 80 includes a first material 10 and a second material 20, in which the first material 10 includes N protrusions, and N is greater than or equal to 2. For example, as shown in FIG. 17 where N=2, the first material 10 has two protrusion 11, 12. Each of the protrusions 11, 12 of the first material 10 is engaged with the second material 20. The multi-zone structure lens of the laser beam shaping device 100 would modify the compact parallel laser light beams into multiple discrete surrounding sets of parallel laser light beams (separated by interior dark areas), and, after these sets of parallel laser light beams penetrate through the focusing lens, these sets of parallel laser light beams would be focused into respective concentrated and oblique light beams toward the focal point of the focusing lens. As shown in FIG. 17, the first incident beams L31 and the second incident beams L32 are obliquely projected into the second material 20, not follow the dashed incident beams L4 vertically down toward the second material 20. Apparently, in the welding process for forming the structure of FIG. 17, the focal point of the focusing lens is arranged to be deep into the second material 20, so that the first incident beams L31 and the second incident beams L32 would form the same angle Z3 with respect to the normal line A3 of the first or second material 10, 20. Preferably, the angle Z3 is ranging within 1°-89°, different to 90° in FIG. 16. In this embodiment, the reason that the same angle Z3 for the first and second incident light beams L31, L32 is because the refractive structure 114 of the multi-zone structure lens 110 is a symmetric structure and extends to pass the center point of the 110 (see FIG. 3).

In this embodiment, each of the protrusions 11, 12 is an oblique protrusion having a directing direction DL and an angle Z4 with respect to a normal line A4 of the interface 15 of the first material 10 and the second material 20. The directing direction DL is the direction for the end portions T1, T2 of the oblique protrusions 11, 12 to dig further into the second material 20. On the other hand, due to laser heat, the second material 20 would have N recessed cavities 21, 22, and each of the recessed cavities 21, 22 is a concave hole from the interface 15. Further, the quantity of the recessed cavities 21, 22 is equal to that of the protrusions 11, 12. In the example shown in FIG. 17, two recessed cavities 21, 22 are shown.

In this embodiment, either the first incident beams L31 or the second incident beams L32 are led into the second material 20 by the same oblique angle for generating a melting area having a high impact zone H1 and a low impact zone H2. Since the first incident beams L31 and the second incident beams L32 are oblique, thus the corresponding melting area would progress in an oblique manner. The pressure difference caused by an asymmetrical energy distribution of the incident beams would induce unbalanced back flows in the melting area. For example, as shown in FIG. 17, two back flows of the melted second material 20 (metal for example) are present to flow the melted metal from a high impact zone H1 to a low impact zone H2.

In this embodiment shown in FIG. 17, the second material 20 has at least one anchor protrusion 23, the anchor protrusion 23 is accompanied by two neighboring protrusions 11, 12. The anchor protrusion 23 includes a head portion 232 and a neck portion 234, the head portion 232 is an extension of the neck portion 234, and the neck portion 234 is formed between the two end portions T1, T2 of the respective oblique protrusions 11, 12. Due to the dark zone arrangement and the determination at the location of the focal point of the focusing lens, the melting area into the second material corresponding to each set of incident light beams would progress in an oblique manner, such that the head-neck formulation for the anchor protrusion 23 would be generated. Since multiple sets of incident light beams are provided to the same light source beams by introducing the refractive structure according to this disclosure, the quantity of the protrusions 11, 12 of this disclosure can be times more than those produced by the prior art. In addition, the neck portion 234 of the anchor protrusion 23 is formed by the progress of the two neighboring protrusions 11, 12 symmetrically with respect to a center line passing the center point, and thus no structural weakness can be obviously located. In comparison to FIG. 13B, FIG. 13C or FIG. 16, the laser interlocking welding structure 80 of FIG. 17 would benefit the interlocking of the first material 10 and the second material 20 at the interface 15. Due to the laser interlocking welding structure 80 provided by this disclosure, the whole contact area at the interface between the two materials would be significantly increased, and also the welding strength can be substantially improved.

In summary, in the laser beam shaping device and the laser processing system provided by this disclosure, the multi-zone structure lens of the laser beam shaping device can divide the light source beams into multiple separate sets of light beams for providing multiple and oblique projections into the target material, and thus the laser interlocking welding structure would be formed at the interface of the two welding materials. Thereupon, except that the contact area at the interface can be increased, the laser interlocking welding structure produced by the laser beam shaping device and the laser processing system of this disclosure can enhance the bonding between the two materials to be welded together (metal and glass for example), and also increase the welding strength of these two materials.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. A laser beam shaping device, applied to process an interface between a first material and a second material, the laser beam shaping device comprising:
   a multi-zone structure lens, including a lens body and a refractive structure, the lens body having an incident plane and an emission plane parallel to the incident plane, one of the incident plane and the emission plane being furnished with the refractive structure, the refractive structure having a depth into the lens body along an optical axis of the lens body, the lens body allowing a light source to penetrate through, wherein the light source passing through the refractive structure deviates away from the refractive structure and leaves the lens body via the emission plane, the light source passing through the lens body is divided into 2×(N−1) sets of light beams; and
   a focusing lens, used for receiving the 2×(N−1) sets of light beams from the multi-zone structure lens, wherein, after the 2×(N−1) sets of light beams penetrate through the focusing lens respectively, 2×(N−1) set of incident beams are formed to project the interface of the first material and the second material in an oblique inward manner with respect to an optical axis of the focusing lens, and the refractive structure is a concave structure recessed into at least one of the incident plane and the emission plane of the lens body;
   wherein the multi-zone structure lens has N−1 refractive structures passing through a center point of the lens body, and the optical axis passes through the center point, where N is greater than or equal to 2; and
   wherein, with the N−1 refractive structures, the lens body has 2×(N−1) protruding structures, and each of the protruding structures has an angle of 360°/(2×(N−1)) defined by the neighboring refractive structures.

2. The laser beam shaping device of claim 1, wherein the multi-zone structure lens is a step structure.

3. The laser beam shaping device of claim 1, wherein each of the protruding structures has a height with respect to a bottom of the neighboring refractive structure.

4. The laser beam shaping device of claim 1, wherein an angle between a normal line of an inclined plane of each of the refractive structures and another normal line of the lens body is Z2, and $$Z2 = \sin^{-1}\frac{n1}{n2},$$

in which n1 is material refractivity of the multi-zone structure lens, and n2 is air refractivity.

5. The laser beam shaping device of claim 1, wherein an inner surface of each of the refractive structures is a plane.

6. The laser beam shaping device of claim 1, wherein an inner surface of each of the refractive structures is a polished surface.

7. The laser beam shaping device of claim 1, wherein the multi-zone structure lens rotates parallel to the incident plane and the emission plane about an optical axis of the lens body passing through a center point of the multi-zone structure lens.

8. The laser beam shaping device of claim 1, further including a movable platform connected with the multi-zone structure lens, the movable platform displacing the multi-zone structure lens to adjust spacing between the multi-zone structure lens and the focusing lens.

9. The laser beam shaping device of claim 1, further including a beam expander for projecting the light source onto the multi-zone structure lens.

10. The laser beam shaping device of claim 9, further including a movable platform connected with the beam expander, the movable platform displacing the beam expander to adjust spacing between the multi-zone structure lens and the beam expander.

11. A laser processing system, applied to process an interface between a first material and a second material, the laser processing system comprising:
   a laser source to emit a light source;
   a control system; and
   a laser beam shaping device, including:
   a multi-zone structure lens, including a lens body and a refractive structure, the lens body having an incident plane and an emission plane, one of the incident plane and the emission plane being furnished with the refractive structure, the refractive structure having a depth into the lens body along an optical axis of the lens body, the lens body allowing light source to penetrate through, wherein the light source passing through the refractive structure deviates away from the refractive structure and leaves the lens body via the emission plane, and the light source passing through the lens body is divided into 2×(N−1) sets of light beams; and a focusing lens, used for receiving the 2×(N−1) sets of light beams from the multi-zone structure lens, wherein, after the 2×(N−1) sets of light beams penetrate through the focusing lens respectively, 2×(N−1) set of incident beams are formed to project the interface of the first material and the second material in an oblique inward manner with respect to an optical axis of the focusing lens, and the refractive structure is a concave structure furnished to at least one of the incident plane and the emission plane of the lens body;

wherein the multi-zone structure lens has N−1 refractive structures passing through a center point of the lens body, and the optical axis passes through the center point, where N is greater than or equal to 2; and wherein, with the N−1 refractive structures, the lens body has 2×(N−1) protruding structures, and each of the protruding structures has an angle of 360°/(2×(N−1)) defined by the neighboring refractive structures.

12. The laser processing system of claim 11, wherein the multi-zone structure lens is a step structure.

13. The laser processing system of claim 11, wherein each of the protruding structures has a height with respect to a bottom of the neighboring refractive structure.

14. The laser processing system of claim 11, wherein an angle between a normal line of an inclined plane of each of the refractive structures and another normal line of the lens body is Z2, and $$Z2 = \sin^{-1}\frac{n1}{n2},$$

in which n1 is material refractivity of the multizone structure lens, and n2 is air refractivity.

15. The laser processing system of claim 11, wherein an inner surface of each of the refractive structures is a plane.

16. The laser processing system of claim 11, wherein an inner surface of each of the refractive structures is a polished surface.

17. The laser processing system of claim 11, further including a rotating mechanism for mounting the multi-zone structure lens, the rotating mechanism being used for rotating the multi-zone structure lens.

18. The laser processing system of claim 11, further including a movable platform connected with the multi-zone structure lens, the movable platform displacing the multi-zone structure lens to adjust spacing between the multi-zone structure lens and the focusing lens.

19. The laser processing system of claim 11, further including a beam expander for projecting the light source onto the multi-zone structure lens.

20. The laser processing system of claim 19, further including a movable platform connected with the beam expander, the movable platform displacing the beam expander to adjust spacing between the multi-zone structure lens and the beam expander.

21. The laser processing system of claim 11, further including a reflective lens for receiving and further reflecting the light source emitted by the laser source.

22. The laser processing system of claim 11, further including a clamping device for clamping fixedly the first material and the second material.

* * * * *